US012280422B2

(12) United States Patent
Beals

(10) Patent No.: US 12,280,422 B2
(45) Date of Patent: Apr. 22, 2025

(54) CONFORMAL COOLING INSERT

(71) Applicant: Randy S. Beals, Grand Ledge, MI (US)

(72) Inventor: Randy S. Beals, Grand Ledge, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 18/284,641

(22) PCT Filed: Apr. 1, 2022

(86) PCT No.: PCT/US2022/023038
§ 371 (c)(1),
(2) Date: Sep. 28, 2023

(87) PCT Pub. No.: WO2022/212834
PCT Pub. Date: Oct. 6, 2022

(65) Prior Publication Data
US 2024/0173767 A1  May 30, 2024

Related U.S. Application Data

(60) Provisional application No. 63/169,618, filed on Apr. 1, 2021.

(51) Int. Cl.
*B22D 17/22* (2006.01)
*B22C 9/06* (2006.01)
(Continued)

(52) U.S. Cl.
CPC .......... *B22D 17/2218* (2013.01); *B22C 9/061* (2013.01); *B22C 9/065* (2013.01); *B22D 15/04* (2013.01); *C22C 38/002* (2013.01); *C22C 38/02* (2013.01); *C22C 38/04* (2013.01); *C22C 38/22* (2013.01); *C22C 38/24* (2013.01)

(58) Field of Classification Search
CPC .... B22D 17/2218; B22D 15/04; B22C 9/061; B22C 9/065
See application file for complete search history.

(56) References Cited

U.S. PATENT DOCUMENTS

| 5,775,402 A | 7/1998 | Sachs et al. |
| 2011/0174458 A1 | 7/2011 | Matsuura et al. |

(Continued)

FOREIGN PATENT DOCUMENTS

| CN | 210587089 U | 5/2020 |
| WO | 2019217781 A1 | 11/2019 |

OTHER PUBLICATIONS

EP Application No. 22782288.9 Extended European Search Report, Issued Feb. 14, 2025, 12 pages.

(Continued)

*Primary Examiner* — Kevin P Kerns
*Assistant Examiner* — Steven S Ha
(74) *Attorney, Agent, or Firm* — Dickinson Wright PLLC

(57) ABSTRACT

A cooling insert for a die, such as a distributor for a high pressure die casting assembly, and a method of manufacturing the cooling insert, is provided. The cooling insert can be formed of H13 tool steel and is manufactured using an investment casting process, for example, a process which uses a printed investment casting shell. The cooling insert includes complex cooling channels to improve cooling and reduce the duration of the casting process.

9 Claims, 4 Drawing Sheets

(51) Int. Cl.
*B22D 15/04* (2006.01)
*C22C 38/00* (2006.01)
*C22C 38/02* (2006.01)
*C22C 38/04* (2006.01)
*C22C 38/22* (2006.01)
*C22C 38/24* (2006.01)

(56) References Cited

U.S. PATENT DOCUMENTS

2015/0251246 A1* 9/2015 Reikher .................. B22C 9/065
164/113
2018/0369904 A1 12/2018 Adams et al.

OTHER PUBLICATIONS

Otai: "H13 Tool Steel", XP093241205, Retrieved from the Internet: URL: https://www.astmsteel.com/product/h13-tool-steel-x40crmov5-1-skd6l-hot-work-steel.

Rannar L-E et al., "Efficient cooling with 1-15 tool inserts manufactured by electron beam melting", Rapid Prototyping Journal, Mcb University Press, Bradford, GB, vol. 13, No. 3, Jan. 1, 2007 (Jan. 1, 2007), pp. 128-135, XP002563021, ISSN: 1355-2546, DOI: 10.1108/13552540710750870.

Feng Shaochuan et al: "Design and 1-15 fabrication of conformal cooling channels in molds: Review and progress updates", International Journal of Heat and Mass Transfer, Elsevier, Amsterdam, Nl, vol. 171, Mar. 10, 2021 (Mar. 10, 2021), XP086557703, ISSN: 0017-9310, DOI: 10.1016 / J. Ijheatmasstransfer. 2021.121082.

* cited by examiner

|  Die Close |  Die Open |
|  Metal pour (Dosing furnace) |  Eject and extract |
|  Slow and fast shot |  Die Spray (Bohmer; both sides;normal) |
|  Dwell (no special cooling features) |  Blow off |

CONFORMAL COOLING INSERT

CROSS REFERENCE TO RELATED APPLICATIONS

This U.S. National Stage Patent Application claims the benefit of PCT International Patent Application Serial No. PCT/US2022/023038 filed Apr. 1, 2022 entitled "CONFORMAL COOLING INSERT" which claims the benefit of and priority to U.S. Provisional Patent Application No. 63/169,618, filed Apr. 1, 2021, entitled "Conformal Cooling Insert," the entire disclosures of which are hereby incorporated by reference in its entirety.

BACKGROUND OF THE INVENTION

1. Field of the Invention

The invention relates generally to a cooling insert for a die, such as an insert for use in a high pressure die casting assembly, and methods of manufacturing the cooling insert.

2. Related Art

High-pressure die casting (HPDC) is often used to manufacture parts formed of metal, for example parts formed of aluminum or an aluminum alloy, for use in vehicles. The HPDC process includes closing a pair of die halves to form a sealed cavity, injecting molten metal under high pressure into the sealed cavity, and holding the metal under pressure in the sealed cavity until the molten metal solidifies. Once the metal in the die solidifies, the upper and lower die halves open and the solidified metal part is released. The die is then prepared for the next casting cycle.

The longest step of the HPDC process is the solidification step, or dwell time, specifically the time it takes for the molten metal to solidify in the die. Currently, many dies include metal inserts with cooling channels along the travel path of the molten metal or along the die cavity. During the casting process, water or another cooling fluid flows through the cooling channels to cool the metal. The inserts with complex cooling channels have been formed by additive manufacturing. However, the additive machining process is expensive and time consuming, and thus more efficient manufacturing of the cooling insert is needed. Improved cooling insert designs are also needed to more efficiently remove heat and thus avoid hot spots and reduce the solidification time.

SUMMARY OF THE INVENTION

One aspect of the invention provides a cooling insert for a die and a more efficient method of manufacturing the cooling insert for a die. The cooling insert is formed of a steel material including chromium (Cr) in an amount of 4.75-5.50 weight percent (wt. %), molybdenum (Mo) in an amount of 1.10-1.75 wt. %, silicon (Si) in an amount of 0.80-1.20 wt. %, vanadium (V) in an amount of 0.80-1.20 wt. %, carbon (C) in an amount of 0.32-0.45 wt. %, manganese (Mn) in an amount of 0.20-0.50 wt. %, phosphorous in an amount up to 0.03 wt. %, sulfur in an amount up to 0.03 wt. %, and possibility impurities in an amount up to 0.2 wt. %, based on the total weight of the steel material. The steel material includes at least one cooling channel; and the steel material has a hardness of 380 to 480 HV10 and a yield strength of 900 to 1300 MPa.

Another aspect of the invention provides an apparatus for high pressure die casting (HPDC) parts formed of aluminum or aluminum alloy. The apparatus comprises a die including a surface presenting cavity for containing molten aluminum or aluminum alloy. The cooling insert is disposed along the surface presenting the cavity.

Yet another aspect of the invention provides a method of high pressure die casting a part comprising the steps of: disposing the cooling insert along a surface of a casting assembly, the surface and the cooling insert presenting a cavity for containing molten metal; and conveying cooling fluid through the at least one cooling channel of the cooling insert while molten metal is disposed in the cavity.

Another aspect of the invention provides a method of manufacturing a cooling insert for use in a high pressure die casting assembly. The method includes investment casting a steel material to form a cooling insert having at least one cooling channel, wherein the steel material includes chromium (Cr) in an amount of 4.75-5.50 weight percent (wt. %), molybdenum (Mo) in an amount of 1.10-1.75 wt. %, silicon (Si) in an amount of 0.80-1.20 wt. %, vanadium (V) in an amount of 0.80-1.20 wt. %, carbon (C) in an amount of 0.32-0.45 wt. %, manganese (Mn) in an amount of 0.20-0.50 wt. %, phosphorous in an amount up to 0.03 wt. %, sulfur in an amount up to 0.03 wt. %, and possibility impurities in an amount up to 0.2 wt. %, based on the total weight of the steel material.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

One aspect of the invention provides an improved cooling insert 10 and method of manufacturing the cooling insert 10, preferably used in or along a die 12 of a high pressure die casting assembly 14. The cooling insert 10 is manufactured using an investment casting process and thus can be formed using H13 tool steel and can also include complex cooling channels 16. This is an improvement over comparative cooling inserts and methods used to form cooling inserts, including inserts formed of H13 tool steel by forging and inserts formed with complex cooling channels using an additive manufacturing process. The forging process is not able to successfully create the desired complex cooling channels, and the additive manufacturing process is not able to form the cooling insert of the H13 tool steel which meets performance requirements.

According to example embodiments, the cooling insert 10 is formed of a steel material, and preferably H13 tool steel. The H13 tool steel includes chromium (Cr) in an amount of 4.75-5.50 weight percent (wt. %), molybdenum (Mo) in an amount of 1.10-1.75 wt. %, silicon (Si) in an amount of 0.80-1.20 wt. %, vanadium (V) in an amount of 0.80-1.20 wt. %, carbon (C) in an amount of 0.32-0.45 wt. %, manganese (Mn) in an amount of 0.20-0.50 wt. %, phosphorous in an amount up to 0.03 wt. %, sulfur in an amount up to 0.03 wt. %, and possibility impurities in an amount up to 0.2 wt. %, based on the total weight of the steel material. According to a preferred embodiment, the steel material includes chromium (Cr) in an amount of 5.25 weight percent (wt. %), molybdenum (Mo) in an amount of 1.35 wt. %, silicon (Si) in an amount of 1.00 wt. %, vanadium (V) in an amount of 1.00 wt. %, carbon (C) in an amount of 0.40 wt. %, and manganese (Mn) in an amount of 0.40 wt. %, and possibility impurities in an amount up to 0.2 wt. %, based on the total weight of the steel material.

According to other embodiments, the cooling insert 10 can be formed of another type of steel material, ferrous material, or iron-based material. For example, the material which forms the cooling insert 10 could be a heat resistant steel casting. Preferably, the heat resistant steel casting does not melt or corrode during high-end industrial operations involving high temperatures, and is capable of performing in conditions above 1200° F. (650° C.). Heat resistant steel castings are usually higher in alloy content than other types of castings. Typically, the heat resistant steel castings mainly consist of nickel and chromium. Nickel is usually present in an amount up to 70 wt. %. Chromium is usually present in an amount of 10 wt. % to 30 wt. %. Other elements, however, are used as well. These include iron, carbon, silicon, manganese, and molybdenum. Additions of up to 0.60 wt. % of niobium might be added to the composition for applications requesting strong resistance to creep.

Figure 1:
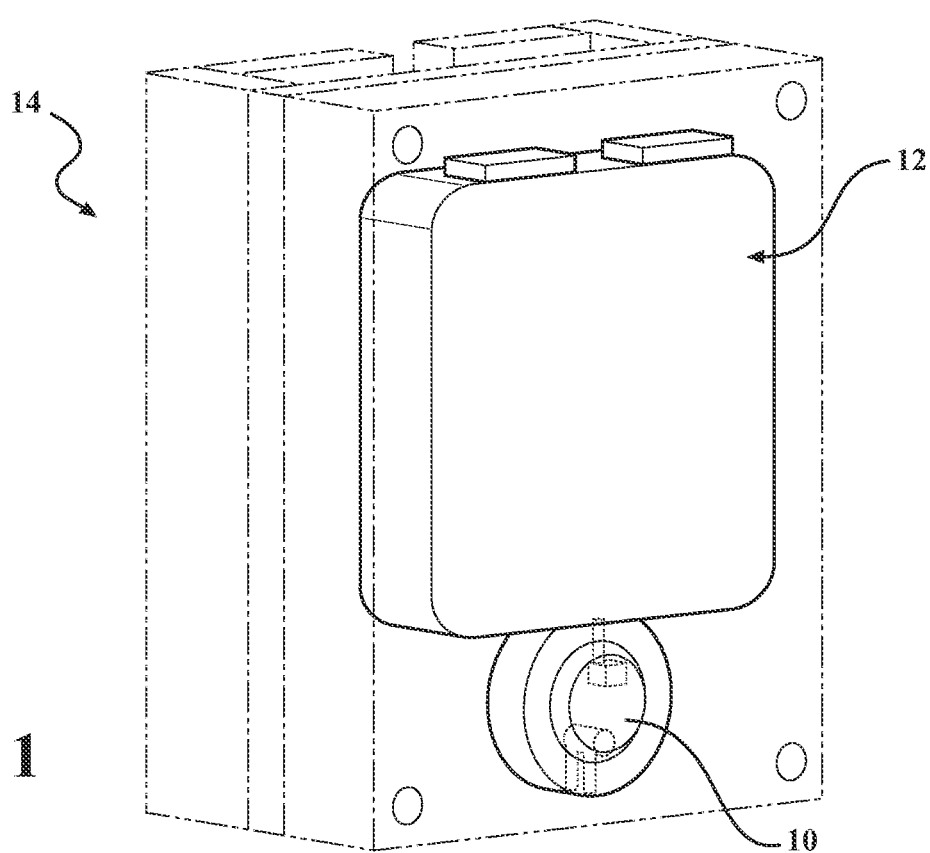
FIG. 1 shows a high pressure die casting assembly including a cooling insert according to an example embodiment
Figure 2A:
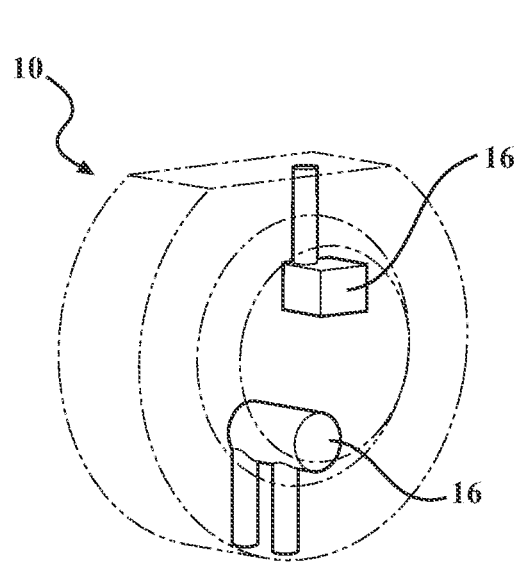
FIG. 2A is an enlarged view of the cooling insert of FIG. 1.
Figure 2B:
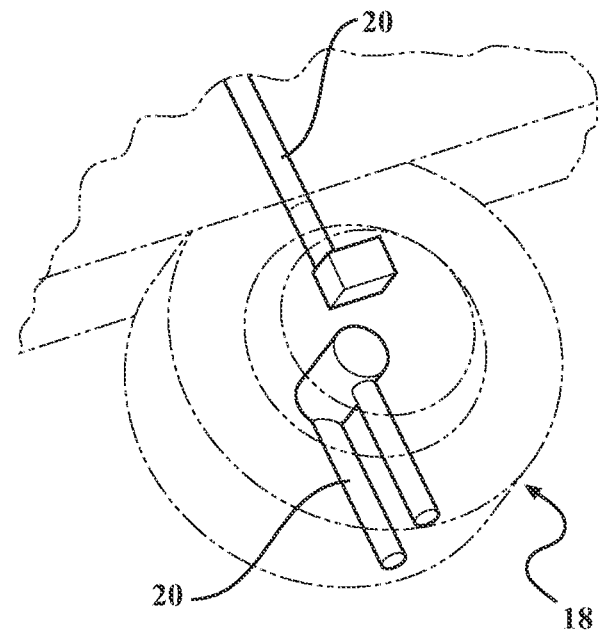
FIG. 2B is a comparative cooling insert.
Figure 3:
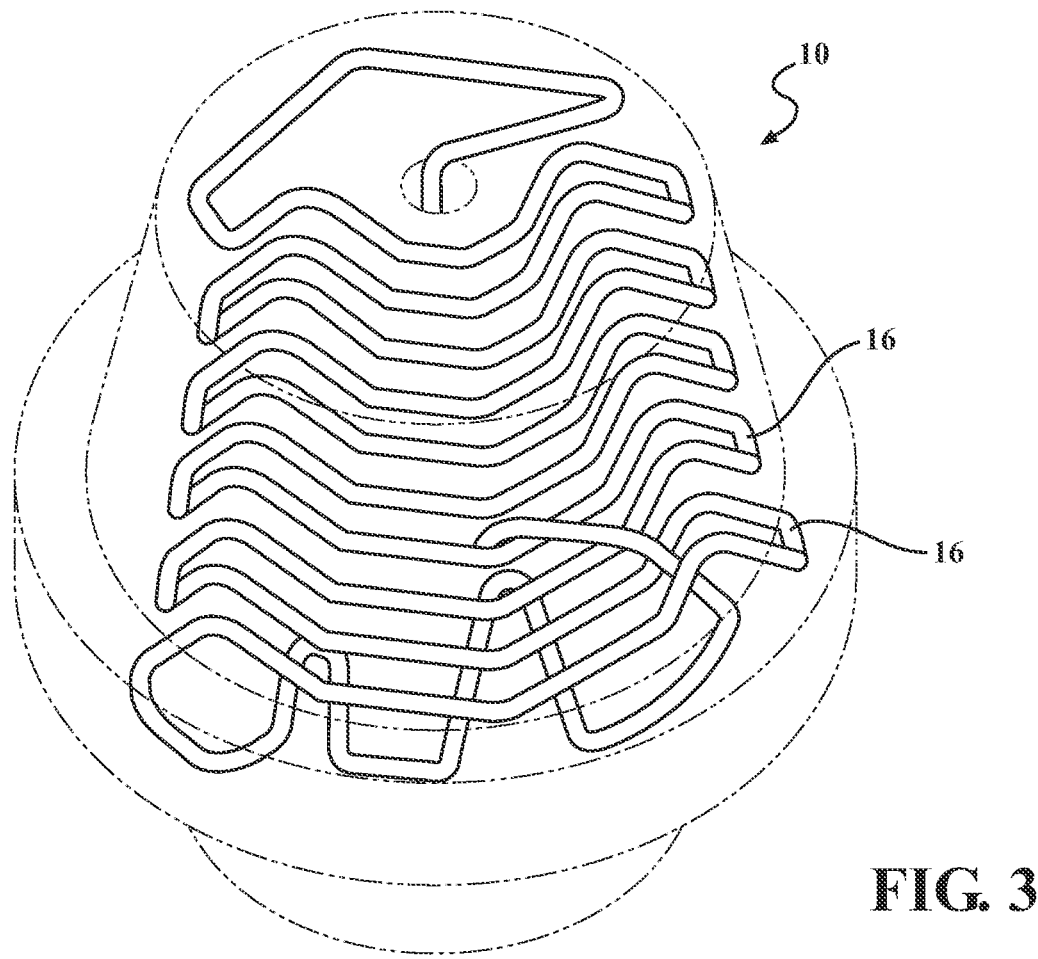
FIG. 3 illustrates a cooling insert according to another example embodiment.
Figure 4:
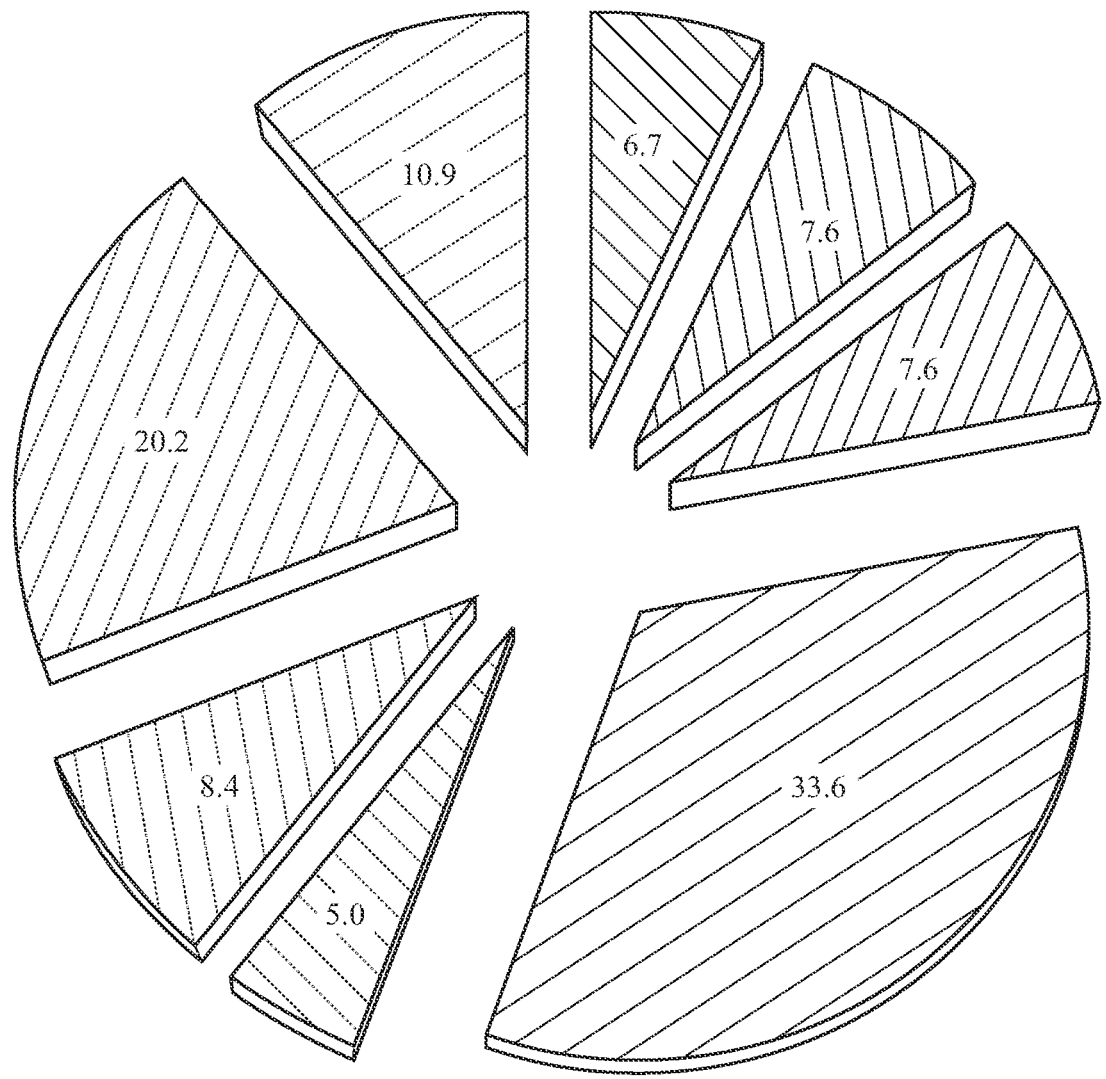
FIG. 4 is a pie chart illustrating an example of the steps, in seconds of a cycle time, of a high pressure die casting process.
Figure 4:
Figure 4:
Figure 4:
Figure 4:
Figure 4:
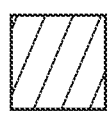
Figure 4:
Figure 4:
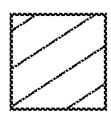
Figure 4:

The cooling insert 10 includes at least one complex cooling channel 16 and typically a plurality of complex cooling channels 16 designed for more efficient cooling of the steel material during the HPDC process, relative to comparative cooling inserts which include conventional cooling channel(s). According to a preferred example embodiment, the cooling insert 10 is used for high pressure die casting (HPDC), and more specifically as a cooling insert 10 for a distributor of the die 12. An example of the high pressure die casting assembly 14 including the die 12 with the insert 10 in the form of the distributor is shown in FIG. 1. An enlarged view of the cooling insert 10 is shown in FIG. 2A and a comparative cooling insert, also a distributor, is shown in FIG. 2B. FIG. 3 shows an example of the cooling insert 10 according to another example embodiment. During the HPDC process, the molten aluminum or other melted metal material is introduced under high velocity and pressure into the casting tooling assembly 14. In the example embodiment, the melted metal is pushed into a "biscuit" area that is adjacent the cooling insert 10, in this case the distributor, before entering a cavity between upper and lower halves of the die 12. The molten metal in the cavity, as well as the molten metal along the distributor, must be solidified before it is removed from the casting assembly 14. FIG. 4 is a pie chart of the steps of an example HPDC process which illustrates that the solidification step is the longest step in the process. The complex cooling channels 16 in the distributor which allow cooling fluid to flow therethrough reduce the significant amount of time required for the molten steel material to solidify along the distributor.

As stated above, FIG. 2A is an example of the improved cooling insert 10 with the complex cooling channels 16, and FIG. 2B is an example of the comparative cooling insert 18 with conventional cooling channels 20. The cooling insert 18 presents a portion of a cavity surface along which molten metal flows. Typically, each cooling channel 20 includes at least one curve, and preferably a plurality of curves or bends, for example at least two, at least three, at least four, at least five, at least ten, at least fifteen, or more curves or bends. Each cooling channel 16 typically has a diameter ranging from 4 mm to 10 mm. The cooling insert 10 of the present invention can have a greater number of cooling channels 16 and can include cooling channels 16 which are closer to the cavity surface (the surface of the cooling insert 10 along which the molten metal flows) of the cooling insert 10, relative to comparative cooling inserts. According to example embodiments, the distance between at least one of the cooling channels 16 and the cavity surface is approximately 1.5× (for example 1.2× to 1.8×) the diameter of the cooling channel 16. For example, for a 5 mm diameter cooling channel 16, the depth of the cooling channel 16, relative to the cavity surface of the cooling insert 10, would be 6 to 7.5 mm. In the example of FIG. 3, the cooling channel 16 has a numerous curves and includes multiple segments 22 located parallel to one another. The segments 22 which are parallel to one another are located the same distance from the cavity surface. The cooling insert 10 of the present invention is also less expensive to manufacture and more durable than the comparative cooling inserts which include the same type of complex cooling channels but which are not formed using the investment casting process.

As stated above, the method of manufacturing the cooling insert 10 with the at least one complex cooling channel 16 includes an investment casting process. The conventional investment casting process (lost wax method) begins with forming a wax pattern by injecting wax into a prefabricated die having the same geometry as the desired cast part to be formed in the casting assembly. The wax pattern is then attached to a wax gating system, which includes at least one channel through which molten material can flow. Multiple wax patterns can be attached to the gating system. The next stage is the shell building, wherein the wax assembly is immersed into a refractory ceramic slurry of hardening mixtures followed by drying. This operation is repeatedly carried out resulting in formation of a solid ceramic shell, preferably having a thickness of ¼ inch to ⅜ inch (6 mm to 9 mm). The ceramic shell is designed with cooling channels and has a design which is the negative of the desired design of the part to be formed. The next stage is dewaxing the ceramic shell. At this stage, the assembly is heated in an autoclave where most of the wax is melted out of the ceramic shell. The ceramic shell is then fired in a furnace so that the residual wax is burnt out.

An example of an investment casting process according to another example embodiment includes the use of a printed investment casting shell and is disclosed by Aristo-Cast. See www.aristo-cast.com/printed-investment-casting-shell-pics/. According to this process, the ceramic shell is formed by three dimensional printing or additive manufacturing the ceramic shell. The printed investment casting shell process does not require the wax mold or expendable patterns to produce the ceramic shell. The printed investment casting shell process can produce the ceramic shell with features that cannot be made or are difficult to make by the conventional investment casting process, such the complex cooling channels.

After the ceramic shell is formed, the ceramic shell can be placed in a box of sand, preheated, for example to 1830° F. (1000° C.), and filled with the molten steel material, typically the H13 tool steel, which is used to form the cooling insert 10. After the steel material solidifies and cools, the ceramic is broken off. The process can include finish machining the cooling insert 10 and then the cooling insert 10 is ready for use in the die 12, such as the die 12 of the high pressure die casting assembly 14.

The process according to the present invention is able to form a cooling insert 10 formed of the H13 tool steel by the investment casting process and which has the following properties: hardness HV10 of 380 to 480; ultimate tensile strength (UTS) of 1000 MPa to 1590 MPa, elongation of 15 to 40%, for example 40%; yield strength of 900 to 1300 MPa, for example 1200 MPa or greater; Young's Modulus of 206 GPa to 190 GPa from 70° C. to 800° C., for example 210 GPa; thermal expansion (at 20° C. to 100° C.) of 10.4 to 12.5*$10^{-6}$/K, for example 11*$10^{-6}$/K; and heat conductivity (from 80 to 800° C.) of 17.6 to 25.0 W/mK, for example 23 W/mK. The cooling insert 10 formed of the H13 is able to achieve those properties at least in part due to the method of manufacturing the cooling insert 10, specifically the investment casting process.

Figure 5:
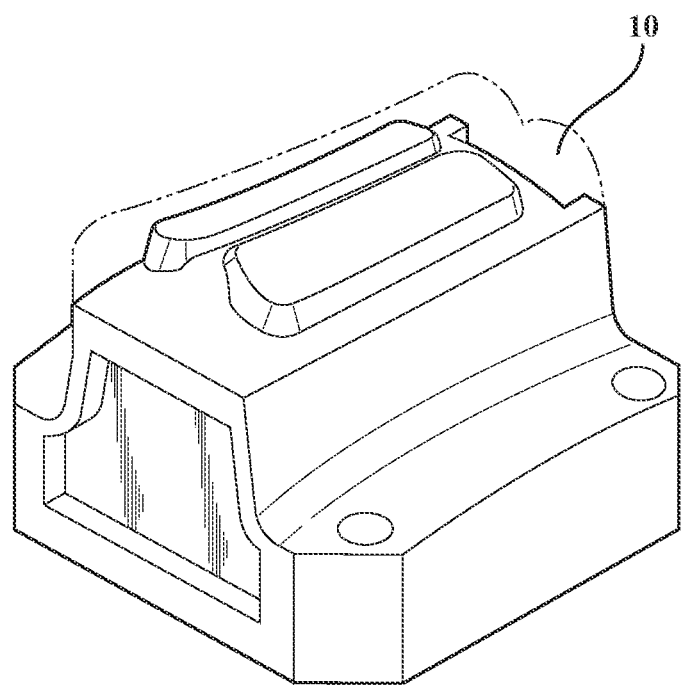
FIG. 5 illustrates the cooling insert located along a press hardening tool according to another example embodiment.
Figure 6A:
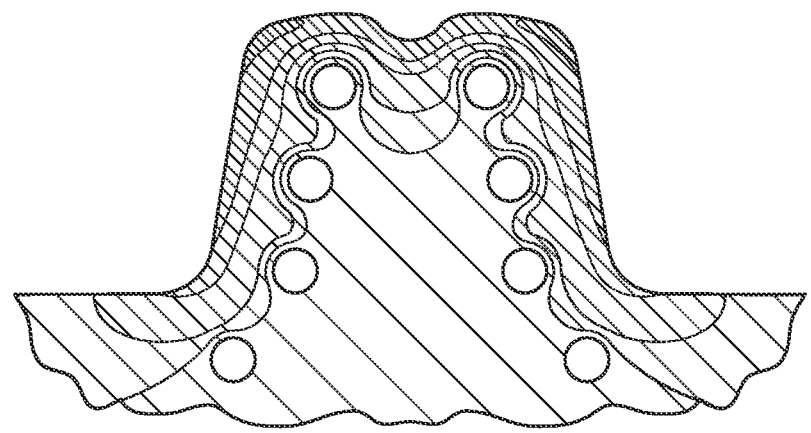
FIG. 6A illustrates a temperature distribution along a die cavity with a conventional cooling insert and FIG. 6B illustrates a temperature distribution along a die cavity with a cooling insert according to an example embodiment of the present invention.
Figure 6B:
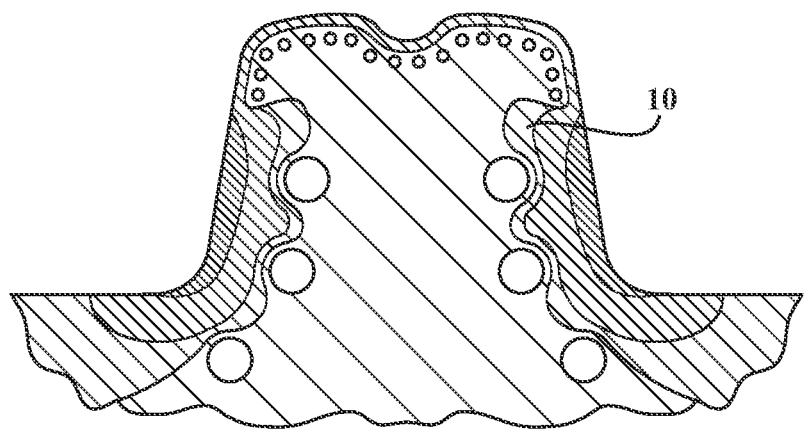

According to another example embodiment, the cooling insert 10 formed by the investment casting process, such as processes including the printed investment casting shell, is disposed on a press hardening tool and presents a surface of the press hardening tool. An example of this type of cooling insert 10 is shown in FIG. 5. FIG. 6A illustrates a temperature distribution along a die cavity with a conventional cooling insert and FIG. 6B illustrates a temperature distribution along a die cavity with a cooling insert according to an example embodiment of the present invention. This comparison shows the temperature is significantly reduced by the presence of the cooling insert 10 according to the example embodiment of the present invention.

As indicated above, the cooling channels 16 can be designed to control the temperature of select portions of the die assembly 14. The cooling channels 16 of the cooling insert 10 of the present invention can be designed uniformly close to the surface of the cooling insert 10. For example, each cooling channel 16 or segment of a cooling channel 16 can be located a distance from the surface along which the molten metal flows of not more than the diameter of the cooling channel 16×1.5. In addition, the complex designs of the cooling channels 16 can reduce the solidification time, which reduces the casting cycle time, and reduces energy consumption.

Obviously, many modifications and variations of the present invention are possible in light of the above teachings and may be practiced otherwise than as specifically described while within the scope of the following claims.

What is claimed is:

1. A cooling insert for a die, comprising:
    a steel material including chromium (Cr) in an amount of 4.75-5.50 weight percent (wt. %), molybdenum (Mo) in an amount of 1.10-1.75 wt. %, silicon (Si) in an amount of 0.80-1.20 wt. %, vanadium (V) in an amount of 0.80-1.20 wt. %, carbon (C) in an amount of 0.32-0.45 wt. %, manganese (Mn) in an amount of 0.20-0.50 wt. %, phosphorous in an amount up to 0.03 wt. %, sulfur in an amount up to 0.03 wt. %, and impurities in an amount up to 0.2 wt. %, based on the total weight of said steel material;
    said steel material including at least one cooling channel;
    said steel material having a hardness of 380 to 480 HV10 and a yield strength of 900 to 1300 MPa, and
    wherein said steel material presents a surface, one cooling channel of said at least one cooling channel has a diameter and is located a distance from said surface equal to 1.5 times to 1.8 times said diameter of said cooling channel.

2. The cooling insert of claim 1, wherein said at least one cooling channel includes a plurality of curves.

3. The cooling insert of claim 2, wherein said at least one cooling channel includes at least ten curves.

4. The cooling inset of claim 1, wherein said steel material includes the chromium (Cr) in an amount of 5.25 weight percent (wt. %), the molybdenum (Mo) in an amount of 1.35 wt. %, the silicon (Si) in an amount of 1.00 wt. %, the vanadium (V) in an amount of 1.00 wt. %, the carbon (C) in an amount of 0.40 wt. %, and the manganese (Mn) in an amount of 0.40 wt. %, based on the total weight of said steel material.

5. The cooling insert of claim 1, wherein said steel material has ultimate tensile strength (UTS) of 1000 MPa to 1590 MPa; elongation of 15 to 40%; yield strength of 900 to 1300 MPa; Young's Modulus of 206 GPa to 190 GPa from 70° C. to 800° C.; thermal expansion at 20° C. to 100° C. of 10.4 to 12.5*$10^{-6}$/K; and heat conductivity from 80 to 800° C. of 17.6 to 25.0 W/mK.

6. The cooling insert of claim 5, wherein said elongation is 40%; said yield strength is 1200 MPa; said Young's Modulus is 210 GPa from 70° C. to 800° C.; said thermal expansion is 11*$10^{-6}$/K at 20° C. to 100° C.; and said heat conductivity from 80 to 800° C. is 23 W/mK.

7. A cooling insert for a die, comprising:
    a steel material including chromium (Cr) in an amount of 4.75-5.50 weight percent (wt. %), molybdenum (Mo) in an amount of 1.10-1.75 wt. %, silicon (Si) in an amount of 0.80-1.20 wt. %, vanadium (V) in an amount of 0.80-1.20 wt. %, carbon (C) in an amount of 0.32-0.45 wt. %, manganese (Mn) in an amount of 0.20-0.50 wt. %, phosphorous in an amount up to 0.03 wt. %, sulfur in an amount up to 0.03 wt. %, and impurities in an amount up to 0.2 wt. %, based on the total weight of said steel material;
    said steel material including at least one cooling channel;
    said steel material having a hardness of 380 to 480 HV10 and a yield strength of 900 to 1300 MPa, and
    wherein said steel material presents a surface, one cooling channel of said at least one cooling channel includes a plurality of curves and a plurality of segments, and said segments are disposed parallel to one another and are located an equal distance from said surface.

8. An apparatus for high pressure die casting (HPDC) parts formed of aluminum or aluminum alloy, comprising:
    a die including a surface presenting cavity for containing molten aluminum or aluminum alloy; and
    said cooling insert of claim 1 disposed along said surface.

9. A method of high pressure die casting a part comprising the steps of: disposing the cooling insert of claim 1 along a surface of a casting assembly, the surface and the cooling insert presenting a cavity for containing molten metal; and conveying cooling fluid through the at least one cooling channel of the cooling insert while molten metal is disposed in the cavity.

* * * * *